US 007028311B2

(12) United States Patent
Roach et al.

(10) Patent No.: US 7,028,311 B2
(45) Date of Patent: Apr. 11, 2006

(54) COMMUNICATIONS NODE ARCHITECTURE AND METHOD FOR PROVIDING CONTROL FUNCTIONS IN A TELECOMMUNICATIONS NETWORK

(75) Inventors: Adam Roach, Dallas, TX (US); Mattias Hartikainen, Dallas, TX (US); Sean Olson, Richardson, TX (US); Shyamal Prasad, Dallas, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 756 days.

(21) Appl. No.: 10/038,978

(22) Filed: Jan. 4, 2002

(65) Prior Publication Data

US 2003/0131151 A1  Jul. 10, 2003

(51) Int. Cl.
G06F 9/44 (2006.01)
(52) U.S. Cl. .................... 719/328; 709/223; 709/230; 455/435.1
(58) Field of Classification Search ................ 719/328; 370/329, 349, 352, 392; 455/502, 433, 435.1; 709/203, 246, 223
See application file for complete search history.

(56) References Cited

U.S. PATENT DOCUMENTS

| 5,634,127 | A  | * | 5/1997  | Cloud et al. ................ 719/313 |
|-----------|----|---|---------|--------------------------------------|
| 6,438,114 | B1 | * | 8/2002  | Womack et al. ............ 370/329 |
| 6,546,247 | B1 | * | 4/2003  | Foti et al. ................... 455/433 |
| 6,615,236 | B1 | * | 9/2003  | Donovan et al. ........... 709/203 |
| 6,654,606 | B1 | * | 11/2003 | Foti et al. ................... 370/392 |
| 6,694,145 | B1 | * | 2/2004  | Riikonen et al. ........... 455/502 |
| 6,725,036 | B1 | * | 4/2004  | Faccin et al. ............... 455/433 |
| 6,763,233 | B1 | * | 7/2004  | Bharatia ..................... 455/433 |
| 6,871,070 | B1 | * | 3/2005  | Ejzak ........................ 455/435.1 |
| 6,904,035 | B1 | * | 6/2005  | Requena ..................... 370/338 |
| 6,917,612 | B1 | * | 7/2005  | Foti et al. ................... 370/352 |
| 2002/0120729 | A1 | * | 8/2002  | Faccin et al. ............... 709/223 |
| 2002/0131395 | A1 | * | 9/2002  | Wang ......................... 370/349 |
| 2002/0194378 | A1 | * | 12/2002 | Foti .......................... 709/246 |

FOREIGN PATENT DOCUMENTS

WO          WO 00 42760 A       7/2000

OTHER PUBLICATIONS

Tsang et al. "Accessing networked appliances using the Session Initiation Protocol" 2001 IEEE, pp. 1280-1285.*
Geppert et al. "Collaboration-based design- Exemplified by the Internet Session Initiation Protocol" 2001 IEEE, pp. 158-167.*

* cited by examiner

Primary Examiner—William Thomson
Assistant Examiner—Van Hoa Nguyen

(57) ABSTRACT

An architecture for a communications node and a method of implementing control functions in a Session Initiation Protocol (SIP) telecommunications network. The node performs a plurality of call-control functions in a single physical node. A plurality of application-level logic blocks corresponding to the plurality of call-control functions are interfaced with a common engine module which is implemented on top of a common operating system and physical platform. The engine module includes SIP behavior functions and SIP stack functions, selected ones of which are operable to perform different call-control functions when interfaced with different application-level logic blocks. Mapping tables within the engine module identify groups of functions that, together with selected logic blocks, perform defined call-control functions. The open architecture allows additional functional logic blocks to be interfaced with the engine module to implement additional call-control functions.

12 Claims, 4 Drawing Sheets

COMMUNICATIONS NODE ARCHITECTURE AND METHOD FOR PROVIDING CONTROL FUNCTIONS IN A TELECOMMUNICATIONS NETWORK

BACKGROUND OF THE INVENTION

1. Technical Field of the Invention

This invention relates to telecommunication systems. More particularly, and not by way of limitation, the invention is directed to a communications node and method for providing control functions in a telecommunications network utilizing the Session Initiation Protocol (SIP).

2. Description of Related Art

Wireless telecommunication networks are evolving from second generation (2G) circuit-switched networks to third generation (3G) packet-switched networks. A reference architecture for a 3G wireless network is being developed by the Third Generation Partnership Project (3GPP). The 3GPP network architecture uses the Session Initiation Protocol (SIP) developed by the Internet Engineering Task Force (IETF) for call setup signaling. Media is then transported through an existing IP network. The SIP standard is described in RFC 2543 which is hereby incorporated in its entirety by reference herein.

In the 3GPP network, control signaling, often referred to as the "control plane", is kept separate from the payload or media, often referred to as the "user plane". When a mobile terminal (MT) is first activated, it registers its existence on a sub-network utilizing SIP call-control signaling through a Call State Control Function (CSCF). The SIP standard is a functional standard and, therefore, does not dictate a specific implementation for the CSCF. Functionally, the CSCF is broken down into a Proxy CSCF (P-CSCF), an Interrogating CSCF (I-CSCF), and a Serving CSCF (S-CSCF). The P-CSCF is the node that the MT directly communicates with, and is the MT's entry point into the SIP network. When the MT first registers, the P-CSCF determines the MT's home network using the domain name in the SIP REGISTER message and a Domain Name Server (DNS). The P-CSCF performs authentication and verification with the specified home network, performs some policy control in terms of determining what the MT is authorized to do, and performs a simple routing function based on a DNS lookup to route the REGISTER message to an I-CSCF in the home network.

The I-CSCF is the entry point into the home network, and serves as a boundary between the home network and a visited network into which the MT may roam. The I-CSCF also queries the MT's Home Subscriber Server (HSS) to identify an S-CSCF for the MT, and then routes the signaling to the S-CSCF. During registration, when the I-CSCF queries the HSS, the HSS determines that the MT does not have an S-CSCF assigned, and instructs the I-CSCF to select an S-CSCF from a plurality of S-CSCFs in the network. The I-CSCF selects one of the S-CSCFs in the network and assigns the MT to the S-CSCF. As long as the registration is valid, that S-CSCF is the MT's S-CSCF. The S-CSCF performs call setup and other telephony services for the MT. Once the MT is registered, the S-CSCF informs the HSS that the S-CSCF is now serving the MT. When calls come in for the MT, and the I-CSCF queries the HSS, the HSS responds with the identity of the assigned S-CSCF.

An originating user need not specify the exact destination address associated with the destination user. The 3GPP network uses aliases associated with particular users to automatically determine the identity of their registered terminals or devices, and to automatically format and deliver communications with the registered devices over an existing IP network. Thus, the 3GPP network architecture provides a centralized and independent communication control mechanism. For a registered user, the 3GPP network and associated elements keep track of the user's exact location and the identity of the user's registered terminal, and accordingly route and enable communication with that registered user over the existing IP network.

In addition to the three types of CSCFs, there are other types of control functions in the SIP network such as Media Resource Control Functions (MRCFs) and Border Gateway Control Functions (BGCFs). An MRCF is used for setting up and controlling conference calls. When two types of user equipment are to be joined in a conference call, and they do not have a common codec, the MRCF handles the signaling to set up digital signal processing hardware for media transcoding, and to start the codecs. The MRCF manages the conference, connects the legs of the call, and so on. A BGCF is used when non-SIP entities are to be joined in a session in the SIP-controlled IP network.

In existing implementation architectures, each control function is implemented independently. That is, the P-CSCF, I-CSCF, S-CSCF, MRCF, BGCF, and other control functions are separate nodes in the SIP network. From the development point of view, this is an inefficient process since there is a large amount of duplicated effort when designing these independent control functions. It would be advantageous to have a more efficient development methodology and control-function architecture. The present invention provides such an architecture and method.

SUMMARY OF THE INVENTION

The present invention provides an architecture for a communications node that enables the node to perform, in a single physical node, a plurality of call-control functions that previously were performed by a plurality of physical nodes. The node has an open architecture that allows additional functional logic blocks to be interfaced with a common engine module to implement additional call-control functions in the node.

Thus, in one aspect, the present invention is directed to an architecture for a communications node in a telecommunications network. The node performs a plurality of call-control functions using an operating system and a single physical platform. The architecture includes a plurality of application-level logic blocks corresponding to the plurality of call-control functions, and a common engine module interfaced with the application-level logic blocks. The engine module includes a plurality of functional blocks, selected ones of which are operable to perform selected ones of the call-control functions when interfaced with selected ones of the application-level logic blocks. The engine module also includes at least one mapping table that interfaces the plurality of application-level logic blocks with the plurality of functional blocks in the common engine module, and selects appropriate functional blocks for matching with the application-level logic blocks.

In another aspect, the present invention is directed to an architecture for a Call State Control Function (CSCF) node in a Session Initiation Protocol (SIP) telecommunications network. The CSCF node performs call-control functions of a Proxy CSCF (P-CSCF), an Interrogating CSCF (I-CSCF), and a Serving CSCF (S-CSCF) while being implemented on top of a single operating system and a single physical platform. The architecture includes an application-level logic block corresponding to the P-CSCF, an application-level logic block corresponding to the I-CSCF, and an application-level logic block corresponding to the S-CSCF. The architecture also includes a common engine module interfaced with the application-level logic blocks. The engine module includes a plurality of SIP behavior functions and a plurality of SIP stack functions, selected ones of which are operable to perform the functions of a P-CSCF, I-CSCF, or S-CSCF when interfaced with an appropriate application-level logic block corresponding to the P-CSCF, I-CSCF, or S-CSCF. The engine module also includes at least one mapping table that interfaces the plurality of application-level logic blocks with the plurality of SIP behavior functions and the SIP stack, and selects appropriate SIP behavior functions and SIP stack functions for matching with the application-level logic blocks. The architecture may also include a plurality of servlet Application Programming Interfaces (APIs) that are operable to provide a plurality of supplemental user services, and a servlet manager interfaced with the plurality of servlet APIs and with the application-level logic blocks. The servlet manager is operable to provide selected ones of the supplemental user services to any one of the application-level logic blocks.

In yet another aspect, the present invention is directed to a method of implementing in a telecommunications network, a communications node that performs a plurality of SIP call-control functions using a single operating system and a single physical platform. The method includes the steps of providing a plurality of application-level logic blocks corresponding to the plurality of call-control functions, assigning a network logic-block address to each of the application-level logic blocks, and interfacing with the application-level logic blocks, a common engine module. The common engine module includes a mapping table, a plurality of SIP stack functions, and a plurality of SIP call-control behavior functions. The method also assigns a network address to each of the SIP stack functions and call-control behavior functions, and stores in the mapping table, the logic-block addresses, SIP stack function addresses, and behavior-function addresses. The application-level logic blocks and the common engine module are implemented on top of the single operating system and the single physical platform. Additionally, the method identifies in the mapping table, a plurality of interface groups, each interface group comprising a set of addresses associated with one selected application-level logic block and at least one of the SIP stack functions and call-control behavior functions that, together, perform the call-control function corresponding to the selected application-level logic block.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
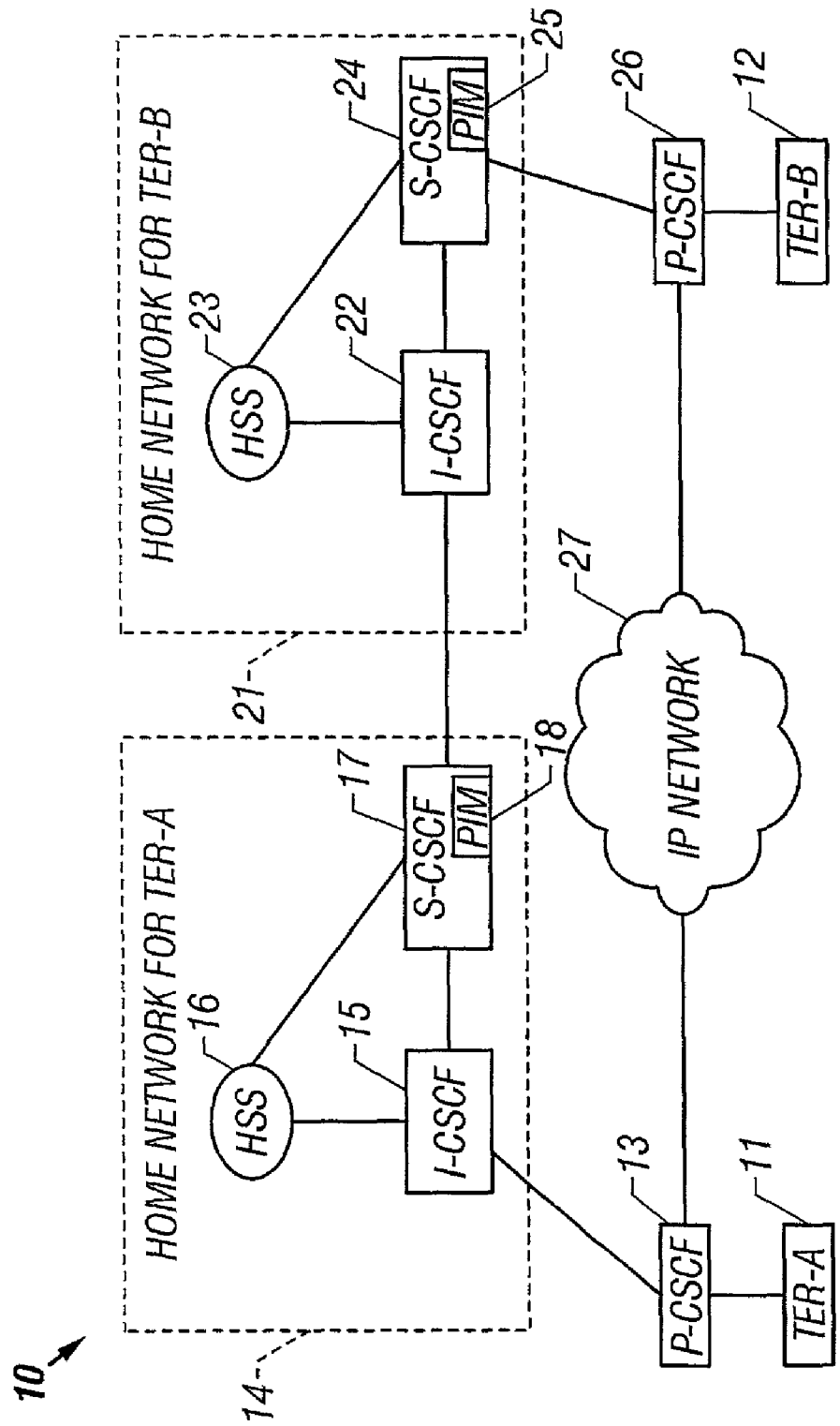
FIG. 1 (Prior Art) is a simplified block diagram of a portion of a typical 3GPP network architecture.

In the drawings, like or similar elements are designated with identical reference numerals throughout the several views thereof, and the various elements depicted are not necessarily drawn to scale. Referring now to FIG. 1, a block diagram of a portion of a typical 3GPP network architecture 10 is depicted. The portion illustrated is suitable for setting up a call between an originating user utilizing Terminal-A 11 and a terminating user utilizing Terminal-B 12. A principal node in the 3GPP architecture is the Call State Control Function (CSCF). Each of the parties has an associated CSCF. The CSCF is essentially a switch that provides the parties with access to the network and routes the call setup signaling between the parties. Each CSCF includes a Proxy CSCF (P-CSCF), an Interrogating CSCF (I-CSCF), and a Serving CSCF (S-CSCF).

The P-CSCF is the first point of contact for a user registering with the network. When Terminal-A 11 registers, the originating P-CSCF 13 determines the home network 14 associated with the originating user and performs authentication and verification with the specified home network. When Terminal-A originates a call, the originating I-CSCF 15 queries an originating Home Subscriber Server (HSS) 16 associated with Terminal-A for user information. The HSS is the master database for a given user and is the network entity containing the subscription-related information to support the network entities actually handling the call/session. The HSS is further used to determine and locate the originating user's S-CSCF 17. The originating S-CSCF provides service invocation and other user features available to the subscribed users. The originating S-CSCF also includes a Presence and Instant Messaging (PIM) server 18.

The terminating (called) user also has an associated home network 21. The terminating home network includes a terminating I-CSCF 22, a terminating HSS 23, and a terminating S-CSCF 24 having a PIM server 25. Terminal-B registers with the terminating home network through a terminating P-CSCF 26. Once call setup is complete, media is exchanged between the two parties via an IP network 27.

Figure 2:
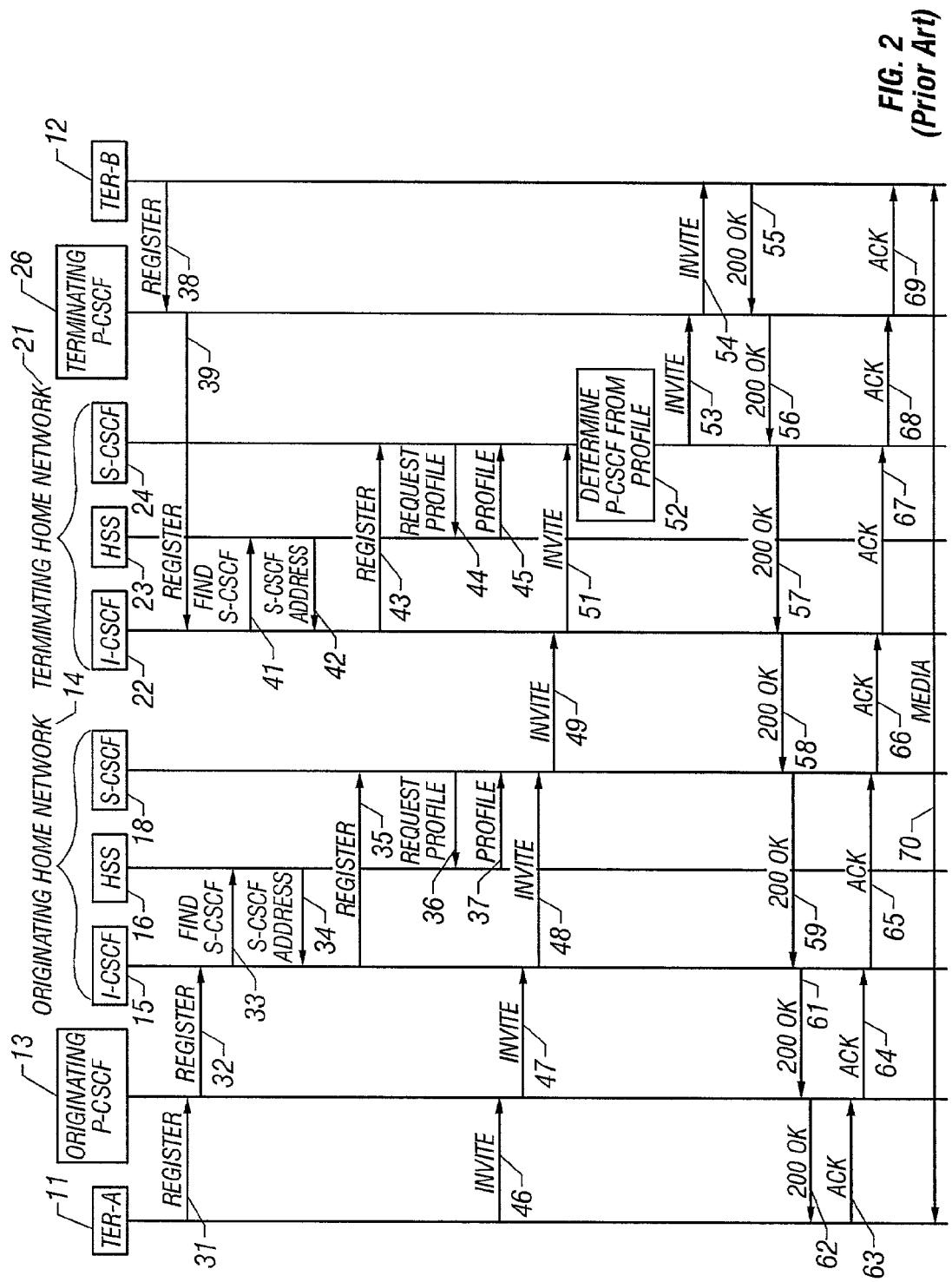
FIG. 2 (Prior Art) is a signaling diagram illustrating typical call setup signaling utilizing SIP signaling in the 3GPP network architecture of FIG. 1.

FIG. 2 is a signaling diagram illustrating typical call setup signaling utilizing SIP signaling in the 3GPP network architecture of FIG. 1. First, the two terminals register with the network. Terminal-A 11 sends a REGISTER message 31 to the originating P-CSCF 13. The originating P-CSCF uses the domain specified in the "From" field of the REGISTER message to determine the home network 14 associated with that particular user, and performs authentication and verification with the specified home network. The Domain Name Server (DNS) record for the home network points to the originating I-CSCF, and at step 32, the P-CSCF sends the REGISTER message to the originating I-CSCF 15. At step 33, the I-CSCF queries the originating HSS 16 associated with that particular originating subscriber for the address of the originating user's current S-CSCF 18. If this is an initial registration with the network, Terminal-A has no S-CSCF. In this case, the HSS returns selection criteria to the I-CSCF, and the I-CSCF selects a suitable S-CSCF for the user from a plurality of available S-CSCFs in the originating home network 14. If the registration is a re-registration, the HSS returns the address of the current originating S-CSCF to the originating I-CSCF, as shown in step 34, where the information is cached.

At step 35, the REGISTER message is forwarded to the originating S-CSCF 18. At 36, the originating S-CSCF queries the originating HSS for User-A's profile information to determine what telephony features the originating user has subscribed to or activated, such as call blocking, call forwarding, voice mail, and the like. At step 37, the HSS returns the profile information to the originating S-CSCF where the information is cached.

Likewise, Terminal-B 12 sends a REGISTER message 38 to the terminating P-CSCF 26. The terminating P-CSCF determines the home network 21 associated with that particular user from the REGISTER message and performs authentication and verification with the specified home network. At 39, the REGISTER message is forwarded to the terminating I-CSCF 22. The terminating I-CSCF queries the terminating HSS 23 at step 41 to identify and locate the terminating S-CSCF 24 where the destination subscriber is currently registered. If this is an initial registration with the network, Terminal-B has no S-CSCF. In this case, the HSS returns selection criteria to the I-CSCF, and the I-CSCF selects a suitable S-CSCF for the user from a plurality of available S-CSCFs in the terminating home network. If the registration is a re-registration, the address of the terminating S-CSCF is returned to the terminating I-CSCF at step 42, where the information is cached. At step 43, the REGISTER message is forwarded to the terminating S-CSCF 24. At step 44, the terminating S-CSCF queries the terminating HSS for User-B's profile information to determine what telephony features the terminating user has subscribed to or activated. At step 45, the terminating HSS returns the profile information to the terminating S-CSCF where the information is cached.

Thereafter, Terminal-A 11 initiates call setup to Terminal-B by sending a SIP INVITE message 46 to the originating P-CSCF 13. SIP enabled multimedia communications include, but are not limited to, voice, video, instant messaging, presence, and a number of other data communications. At step 47, the INVITE message is forwarded to the originating I-CSCF 15 associated with the home network for the originating subscriber, and at 48, the SIP INVITE message is forwarded to the previously identified S-CSCF 18.

The originating S-CSCF 18 provides service invocation and other user features available to Terminal-A 11. Upon verifying that this particular user is able to initiate this particular call connection, the originating S-CSCF then transmits the SIP INVITE message at step 49 to the terminating I-CSCF 22 associated with the home network 21 of the terminating subscriber. At 51, the INVITE message is then forwarded to the terminating S-CSCF. At 52, the terminating S-CSCF determines from the terminating user's profile, the P-CSCF 26 currently serving the terminating Terminal-B 12. At 53, the INVITE message is forwarded to the terminating P-CSCF which then forwards it to Terminal-B at step 54.

Terminal-B 12 responds with a SIP 200 OK message at 55. The terminating P-CSCF 26 forwards the 200 OK message to the S-CSCF 24 in Terminal-B's home network at 56, and the terminating S-CSCF sends the 200 OK message to the terminating I-CSCF 22 at 57. At 58, the terminating I-CSCF 22 sends the 200 OK message to the originating S-CSCF 18 in Terminal-A's home network 14. The originating S-CSCF 18 forwards the 200 OK message at 59 to the originating I-CSCF 15, and at 61, the originating I-CSCF 15 sends the 200 OK message to the originating P-CSCF 13. Finally, at 62, the originating P-CSCF 13 sends the 200 OK message to Terminal-A 11.

At step 63, Terminal-A responds by sending an Acknowledgment to the originating P-CSCF 13 which forwards the Acknowledgment at step 64 to the originating I-CSCF 15. At 65, the originating I-CSCF sends the Acknowledgment to the originating S-CSCF which forwards it at step 66 to the terminating I-CSCF 22 in Terminal-B's home network 21. The terminating I-CSCF sends the Acknowledgment to the terminating S-CSCF 24 at step 67, which forwards it to the terminating P-CSCF 26 at step 68. Finally, at step 69, the terminating P-CSCF forwards the Acknowledgment to Terminal-B 12. Once the destination terminal has been identified and acknowledged, a data channel 70 is directly established between the two terminals over the existing IP network 27, and no further participation is required by the 3GPP network.

Figure 3:
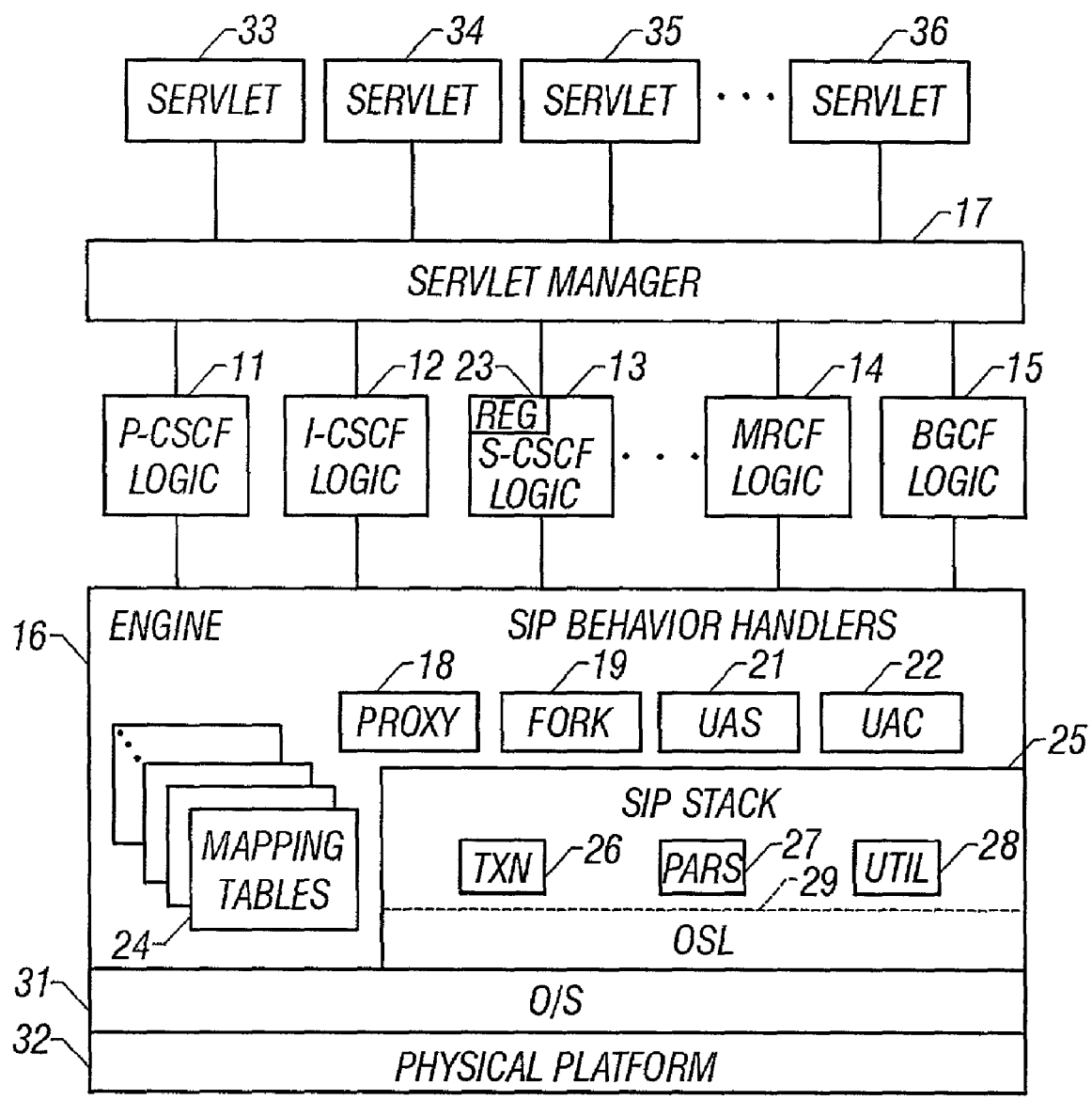
FIG. 3 is a simplified functional block diagram of an architecture for a control node in a telecommunications network implemented in accordance with the teachings of the present invention.

FIG. 3 is a simplified functional block diagram of an architecture for a control node implemented in accordance with the teachings of the present invention. The architecture enables multiple control nodes to be built on the same base architecture, utilizing the same physical platform. Thus, the functions may be co-located in one physical node, and during development, the functions can be built simultaneously in one framework. The invention takes the logical pieces of functionality spelled out in the 3GPP standards and implements them, or multiple instances of them, in one physical node that performs a plurality of control functions.

In essence, the invention takes application-level logic from each of the control functions and implements logic blocks 11–15 between an underlying Engine 16 and an overlying Servlet Manager 17. The logic blocks 11–15 do not represent entire functional nodes as they are currently defined in the standards. Instead, the logic blocks are subsystems performing the application-level logic for the various types of control nodes. For example, a P-CSCF as defined in the 3GPP standards comprises the P-CSCF logic block 11 plus the underlying Engine 16, Operating System (O/S) 31 and Physical Platform 32. Likewise, the I-CSCF comprises the I-CSCF logic block 12 and everything below it, and so on.

The Engine 16 includes standard SIP behavior handlers Proxy 18, Forking Proxy 19, User Agent Server (UAS) 21, and User Agent Client (UAC) 22. Another SIP behavior handler, Registrar 23, handles SIP REGISTER messages and is preferably implemented in the S-CSCF Logic 13 due to data management considerations. Other applications may also act as SIP registrars, and they may be implemented in other ones of the application-level logic blocks. In existing implementations of individual functional control nodes, the SIP behavior handlers are selectively programmed into the individual functions as required. For example, a P-CSCF may utilize the Proxy behavior 18 to forward a signal to a single destination node. An S-CSCF may use the Forking Proxy behavior 19 when the destination user is registered on more than one terminal, and a signal is to be routed to all of the terminals simultaneously. An MRCF may use the UAS behavior 21 when receiving a call for a voice mailbox, and the MRCF may use the UAC behavior 22 to set up legs in a conference call.

In the present invention, the application-level logic blocks 11–15 for each type of control function tell the Engine 16 what type of SIP behavior the logic blocks need to handle a particular task. The Engine includes a plurality of mapping tables 24 implemented throughout the architecture that allow particular configurations to determine what type of node they are, and to access the SIP behaviors they need to perform the functions of that type of node. The plurality of mapping tables pull together all of the functionalities to create each of the application-level functions.

The Engine 16 also includes a SIP Stack 25 which performs reliability and error checking functions associated with signal communications within the node. The functionalities in the SIP stack are standard, but in the present invention, the SIP stack is built as three portable units: a transaction manager (TXN) 26, a Parser (PARS) 27, and a Utility package (UTIL) 28. An Operating System Layer (OSL) 29 binds the three portable units together to form the SIP Stack, and binds the portable units to the O/S 31 which sits on top of the Physical Platform 32.

The Servlet Manager 17 may manage a plurality of Servlet Application Programming Interfaces (APIs) 33–36. In existing designs for stand-alone functional control nodes such as the P-CSCF, there is a physical platform, an O/S, a SIP stack, and then a servlet manager. All of the functionality on top of the servlet manager is in the form of servlet APIs. To use that architecture to build a P-CSCF, for example, the P-CSCF is implemented as a P-CSCF servlet API on top of the servlet manager. In the present invention, however, the basic functionality of the control nodes is implemented in the application-level logic blocks 11–15, and the Servlet Manager 17 and Servlets 33–36 are used only for supplementary or additional services such as call forwarding, call blocking, and so on. The Servlet Manager can interface with all of the application level logic blocks 11–15 to provide additional services.

It should be noted that in the known art, an "engine" is normally thought of as a servlet engine. However, the Engine 16 is not a servlet engine as previously known. The interface between the Engine and the application-level logic blocks 11–15 is servlet API-like, but it is enhanced so that the application-level logic blocks have access to more functions and data. Using this interface, the present invention adds the control function logic layer 11–15 on top of the Engine 16 which does the bulk of the SIP behavior. When supplementary services are to be provided, the Servlet Manager 17 is inserted between the control function logic layer and the Servlets.

The architecture of the present invention uses interface groups to tie the separate logic blocks together to form the different control function types. When the system is provisioned, groups of network addresses are identified. Each group defines the functions necessary to perform a particular call-control function. One such group of network addresses may form, for example, an S-CSCF. Another group may form an ICSCF, and still another group may form an MRCF. When the groups are defined, group-address information is stored in the mapping tables 24 in various parts of the architecture. When a SIP message comes in, such as an INVITE message to begin a session, the SIP Stack 25 does not know it is handling a message for a specific application. The SIP Stack just knows that a SIP transaction is occurring, but the SIP Stack keeps track of which interface group it is in. Based on that interface information, particular application functions may be invoked. This interface mapping allows the co-location of the multiple application-level functions on the same physical platform.

The Servlet Manager 17 works in a similar manner. It does not know how many applications are under it, and it does not know the type of control function for which any particular service is being invoked. The mapping tables 24 track the groups of functionality and ensure that particular application functions are invoked when requested.

Thus, by adding application-level logic to a common engine, SIP stack, operating system, and physical platform, multiple types of nodes, and multiple instances of each type, may be implemented in a single physical node. The platform up to and including the engine can be reused for new 3GPP nodes.

As noted above, the multiple control functions that the present invention implements in a single node are normally implemented as independent nodes. Therefore, they normally communicate with each other by going out to the SIP network. With the present invention, however, the common node architecture can be used to skip network hops. For example, if signaling is to go from an I-CSCF to an S-CSCF, and those functional entities have been implemented in a single physical node, the signaling can be handled internally at the lower levels of the node architecture. The signal does not have to be actually sent out over the network. Thus, an entire CSCF, including P-CSCF, I-CSCF, and S-CSCF may be implemented as a single CSCF node, eliminating much of the network-level signaling.

Figure 4:
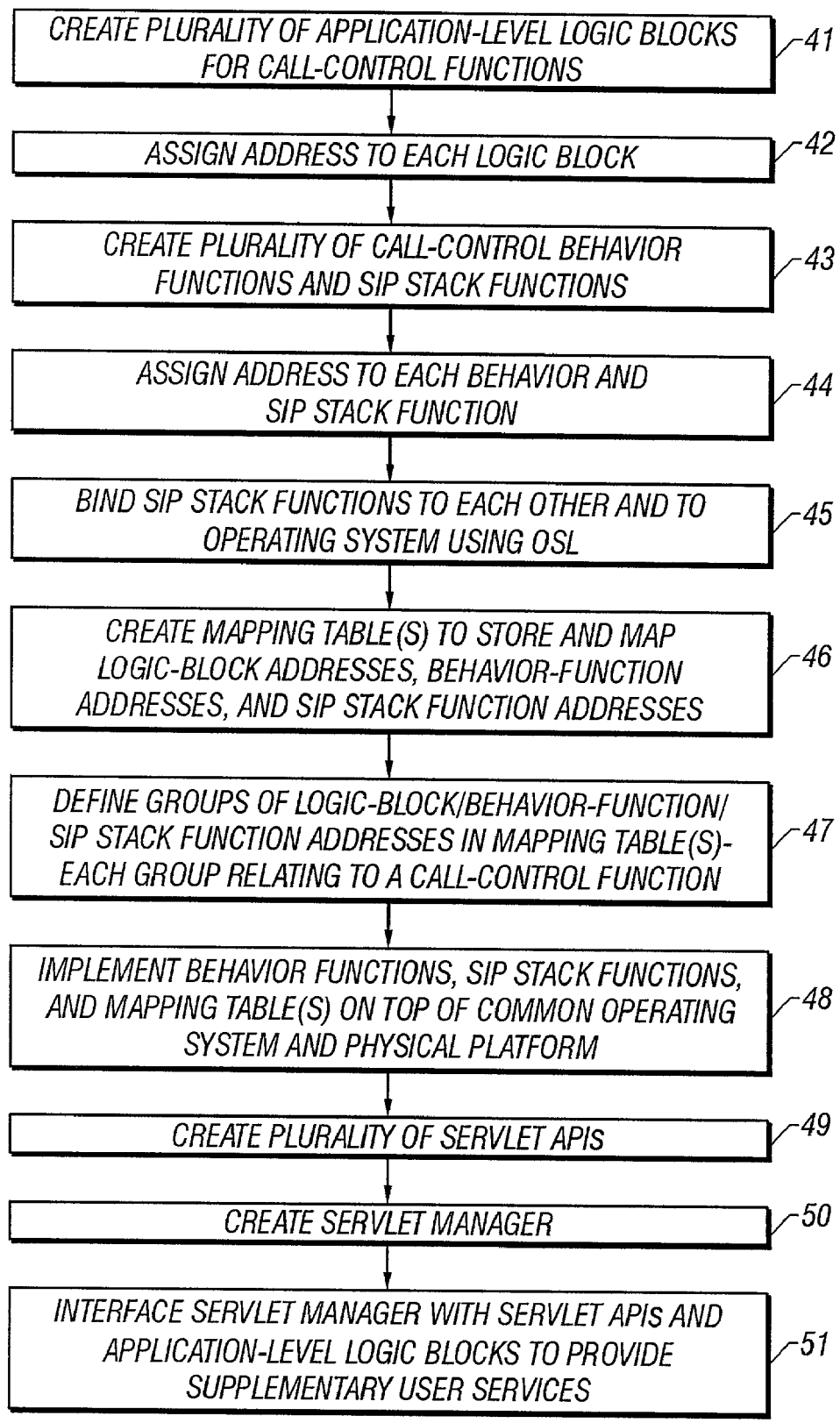
FIG. 4 is a flow chart illustrating the steps of an embodiment of the method of the present invention for implementing the architecture of FIG. 3.

FIG. 4 is a flow chart illustrating the steps of an embodiment of the method of the present invention for implementing the architecture of FIG. 3. At step 41, the plurality of application-level logic blocks 11–15 is created. As noted above, the logic blocks are sub-systems performing the application-level logic for various types of control nodes. At step 42, each of the logic blocks is assigned a network address. At step 43, the SIP call-control behavior functions 18–23, and the SIP Stack 25 are created. The Proxy 18, Forking Proxy 19, UAS 21, and UAC 22 are preferably stored in the Engine 16 while the Registrar 23 is preferably stored in the S-CSCF logic block 13. At step 44, each of the behavior functions and SIP Stack functions is assigned a network address. At step 45, the SIP Stack functions 26–28 are bound to each other and to the O/S 31.

At step 46, one or more mapping tables 24 are created to store and map the logic-block addresses, the behavior function addresses, and the SIP Stack function addresses. At step 47, groups of addresses are identified in the mapping table (s). The address groups include the address of a selected application-level logic block and appropriate behavior functions and SIP Stack functions that, together, perform the call-control function corresponding to the selected application-level logic block. At step 48, the behavior functions, SIP Stack functions, and mapping tables are implemented on top of the common O/S 31 and physical platform 32. Additional SIP functional nodes may be implemented on the same O/S and physical platform by adding the corresponding application-level logic block and mapping the logic block to the appropriate behavior functions and SIP Stack functions.

Optionally, the architecture may be extended to provide supplementary or additional user services. At step 49, the plurality of servlet APIs 33–36 is created. At step 50, the Servlet Manager 17 is created, and at step 51, the Servlet Manager is interfaced with the servlet APIs and with the application-level logic blocks 11–15 to provide supplementary user services to requesting call-control functions.

It is believed that the operation and construction of the present invention will be apparent from the foregoing Detailed Description. While the architecture and method shown and described have been characterized as being preferred, it should be readily understood that various changes and modifications could be made therein without departing from the scope of the present invention as set forth in the following claims. For example, it should be clear to those skilled in the art that the present invention is not limited to providing a CSCF node, but may be practiced to provide any other type of control functions in a 3G network.

Additionally, whereas the use of a specific network architecture and specific messages and signaling protocols has been described in reference to the presently preferred exemplary embodiment of the present invention, such network architectures and signaling implementations are merely illustrative. The communication control node described in the preferred embodiment as being in a 3G SIP network is also applicable to other types of networks in which it is advantageous to implement multiple control functions in a single physical node. Accordingly, all such modifications, extensions, variations, amendments, additions, deletions, combinations, and the like are deemed to be within the ambit of the present invention whose scope is defined solely by the claims set forth below.

What is claimed is:

1. An architecture for a communications node in a telecommunications network, said node performing a plurality of call-control functions using a single physical platform, said architecture comprising:
    a plurality of application-specific logic blocks, each of the application-specific logic blocks performing application-level logic corresponding to one of the plurality of call-control functions;
    an engine module interfaced with and supporting all of the application-specific logic blocks, said engine module comprising:
    a plurality of functional blocks, selected ones of said functional blocks being operable to perform selected ones of the call-control functions when interfaced with selected ones of the application-specific logic blocks;
    at least one mapping table that selectively interfaces selected application-specific logic blocks with the plurality of functional blocks in the engine module, and selects appropriate functional blocks for matching with each application-specific logic block to create a specific call-control function; and
    an operating system supporting all of the functional blocks and application-specific logic blocks;
    a plurality of servlet Application Programming Interfaces (APIs) operable to provide a plurality of supplementary user services; and
    a servlet manager interfaced with the plurality of servlet APIs and with the plurality of application-specific logic blocks, said manager being operable to provide selected ones of the supplementary user services to any one of the application-specific logic blocks;
    wherein the mapping table includes groups of network addresses for application-specific logic blocks and for functional blocks in the engine module, each of said groups of addresses identifying a selected application-specific logic block and at least one functional block in the engine module that together perform the call-control function corresponding to the selected application-specific logic block.

2. The architecture for a communications node of claim 1 wherein the telecommunications network utilizes call-control signaling based on the Session Initiation Protocol (SIP), and the plurality of application-specific logic blocks include logic blocks for a Call State Control Function (CSCF).

3. The architecture for a communications node of claim 2 wherein the plurality of functional blocks in the engine module include a plurality of SIP behavior functions and a SIP stack that performs reliability and error-checking functions associated with signal communications with the communications node.

4. The architecture for a communications node of claim 3 wherein the plurality of SIP behavior functions includes a proxy function, a User Agent Server (UAS) function, and a User Agent Client (UAC) function.

5. The architecture for a communications node of claim 3 wherein at least one of the application-specific logic blocks includes a Registrar SIP behavior function.

6. The architecture for a communications node of claim 3 wherein the SIP stack includes a plurality of portable units, said portable units including:
    a transaction manager;
    a parser; and
    a utility package.

7. An architecture for a Call State Control Function (CSCF) node in a Session Initiation Protocol (SIP) telecommunications network, said node selectively performing call-control functions of a Proxy CSCF (P-CSCF), an Interrogating CSCF (I-CSCF), and a Serving CSCF (S-CSCF), said architecture comprising:
    a plurality of application-specific logic blocks, each of the application-specific logic blocks performing application-level logic corresponding to a different call-control function, said application-specific logic blocks including:
        an application-specific logic block corresponding to the P-CSCF;
        an application-specific logic block corresponding to the I-CSCF; and
        an application-specific logic block corresponding to the S-CSCF;
    an engine module interfaced with and supporting all of the application-specific logic blocks, said engine module implemented on top of a single operating system and a single physical platform, and comprising:
    a plurality of SIP behavior functions and a plurality of SIP stack functions, selected SIP behavior functions and selected SIP stack functions being operable to perform the functions of a P-CSCF, I-CSCF, or S-CSCF when interfaced with an appropriate application-specific logic block corresponding to the P-CSCF, I-CSCF, or S-CSCF; and
        at least one mapping tabie that interfaces the plurality of application-specific logic blocks with the plurality of SIP behavior functions and the SIP stack, and selects appropriate SIP behavior functions and SIP stack functions for matching with the application-specific logic blocks to selectively create a P-CSCF, an I-CSCF, or an S-CSCF:
    a plurality of servlet Application Programming Interfaces (APIs) operable to provide a plurality of suplementary user services; and
    a servlet manager interfaced with the plurality of servlet APIs and with the application-specific logic blocks, said manager being operable to provide selected ones of the supplementary user services to any one of the application-specific logic blocks.

8. The architecture for a CSCF node of claim 7 wherein the plurality of SIP behavior functions in the engine module includes a proxy function, a User Agent Server (UAS) function, and a User Agent Client (UAC) function.

9. The architecture for a CSCF node of claim 7 wherein at least one of the application-specific logic blocks includes a Registrar SIP behavior function.

10. A method of implementing a communications node in a telecommunications network, said node performing a plurality of Session Initiation Protocol (SIP) call-control functions using a single operating system and a single physical platform, said method comprising the steps of:

providing a plurality of application-specific logic blocks, each of the application-specific logic blocks performing application-level logic corresponding to one of the plurality of call-control functions;

assigning a network logic-block address to each of the application-specific logic blocks;

interfacing with the application-specific logic blocks, an engine module that supports all of the application-specific logic blocks, said engine module comprising a mapping table, a plurality of SIP stack functions, and a plurality of SIP call-control behavior functions;

assigning a network address to each of the SIP stack functions and call-control behavior functions;

implementing the application-specific logic blocks, and the engine module on top of the single operating system and the single physical platform;

storing in the mapping table, the logic-block addresses, SIP stack function addresses, and behavior function addresses;

identifying in the mapping table, a plurality of interface groups, each interface group comprising a set of addresses associated with one selected application-specific logic block and at least one of the SIP stack functions and call-control behavior functions that, together, perform the call-control function corresponding to the selected application-specific logic block;

providinng a plurality of servlet Application Programming Interfaces (APIs) that are operable to provide a plurality of supplemental user services; and interfacing a servlet manager with the plurality servlet APIs and with the application-specific logic blocks, said manager being operable to provide selected ones of the supplemental user services to any one of the application-specific logic blocks.

11. The method of implementing a communications node of claim 10 wherein the plurality of SIP call-control behavior functions in the engine module includes a proxy function, a User Agent Server (UAS) function, and a User Agent Client (UAC) function.

12. The method of implementing a communications node of claim 11 further comprising the step of Implementing a SIP Registrar behavior function in at least one of the application-specific logic blocks.

* * * * *